United States Patent
Lin

(10) Patent No.: US 12,550,984 B2
(45) Date of Patent: Feb. 17, 2026

(54) HEADBAND ADJUSTING ASSEMBLY

(71) Applicant: CHENG UEI PRECISION INDUSTRY CO., LTD., New Taipei (TW)

(72) Inventor: Chin-Chung Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 67 days.

(21) Appl. No.: 18/803,743

(22) Filed: Aug. 13, 2024

(65) Prior Publication Data

US 2025/0204655 A1    Jun. 26, 2025

(30) Foreign Application Priority Data

Dec. 20, 2023   (CN) .......................... 202323490091.5

(51) Int. Cl.
*G02B 27/01*    (2006.01)
*A44C 5/18*    (2006.01)

(52) U.S. Cl.
CPC ..................................... *A44C 5/18* (2013.01)

(58) Field of Classification Search
CPC .. A41D 20/00; A42B 1/22; A42B 3/08; A42B 3/085; A42B 3/14; A42B 3/145; A44B 11/06; A44C 5/18; F21V 21/084; G02B 27/017; G02B 27/0176; G02B 3/003; G02B 3/02
USPC ....................................................... 224/181
See application file for complete search history.

(56) References Cited

U.S. PATENT DOCUMENTS

| | | | | |
|---|---|---|---|---|
| 3,079,609 | A  * | 3/1963 | Hoffmaster | A61F 9/06 |
| | | | | 2/8.1 |
| 6,219,851 | B1 * | 4/2001 | Fang | A42B 3/145 |
| | | | | 2/418 |
| 6,314,587 | B1 * | 11/2001 | Fang | A42B 3/145 |
| | | | | 2/418 |
| 7,246,383 | B2 * | 7/2007 | Musal | A44B 11/20 |
| | | | | 2/418 |
| 11,089,831 | B1 * | 8/2021 | Hermansen | A42B 3/08 |

(Continued)

FOREIGN PATENT DOCUMENTS

| | | | |
|---|---|---|---|
| CN | 210835443 U | * 6/2020 | |
| DE | 102020115781 A1 | * 12/2021 | ............ F21V 21/084 |

(Continued)

*Primary Examiner* — Nathan J Newhouse
*Assistant Examiner* — Matthew T Theis
(74) *Attorney, Agent, or Firm* — Cheng-Ju Chiang

(57) ABSTRACT

A headband adjusting assembly includes a main body, an isolating plate, a first headband disposed to one side of the main body, and a second headband disposed to the other side of the main body. The main body has an accommodating space. Two sides of the main body define two openings. The isolating plate is accommodated in the accommodating space. Two sides of a rear surface of the isolating plate protrude rearward to form a first elastic block and a second elastic block exposed out of the two openings. The first headband has a first adjusting portion having a first buckling portion. The first elastic block is elastically buckled with or breaks away from the first buckling portion. The second headband has a second adjusting portion having a second buckling portion. The second elastic block is elastically buckled with or breaks away from the second buckling portion.

15 Claims, 7 Drawing Sheets

(56) References Cited

U.S. PATENT DOCUMENTS

| | | | | |
|---|---|---|---|---|
| 11,632,997 B2* | 4/2023 | Wang | ........................ | A42B 1/22 |
| | | | | 224/181 |
| 2010/0170068 A1* | 7/2010 | Musal | ..................... | A42B 3/145 |
| | | | | 24/68 D |
| 2023/0280020 A1* | 9/2023 | Kung | ....................... | G06F 1/163 |
| | | | | 361/679.03 |

FOREIGN PATENT DOCUMENTS

| | | | | | |
|---|---|---|---|---|---|
| JP | 2003213514 | A | * | 7/2003 | |
| KR | 200199668 | Y1 | * | 10/2000 | ............. G02C 3/003 |
| TW | M624513 | U | | 3/2022 | |
| WO | WO-2017101975 | A1 | * | 6/2017 | ............. A42B 3/145 |
| WO | WO-2018201216 | A1 | * | 11/2018 | ............. A42B 3/145 |

* cited by examiner

HEADBAND ADJUSTING ASSEMBLY

CROSS REFERENCE TO RELATED APPLICATIONS

The present application is based on, and claims priority from, China Patent Application No. 202323490091.5, filed Dec. 20, 2023, the disclosure of which is hereby incorporated by reference herein in its entirety.

BACKGROUND OF THE INVENTION

Field of the Invention

The present invention generally relates to a headband adjusting assembly, and more particularly to a headband adjusting assembly which is applied in a head-mounted display device.

Description of Related Art

In general, a head-mounted display device is able to be used in a virtual reality (VR), an augmented reality (AR), a mixed reality (MR), etc. The virtual reality constructs a highly realistic 3D (Three Dimensional) virtual world by use of a computer simulation way. The augmented reality projects virtual elements into a reality by used of a projection way or a camera combination way. A technology of the mixed reality combines both a VR technology and an AR technology. With the improvement of sciences and technologies, the head-mounted display devices are becoming more and more popular in applications of a medicine field, a military field, an entertainment field, an education field and other fields. In order to adapt to head sizes of different users, the head-mounted display devices are usually equipped with headband adjusting assemblies for adjusting lengths of headbands, so that the users may easily adjust the headbands by themselves to the appropriate lengths for enhancing wearing comfort levels of the users.

A conventional headband adjusting assembly includes a head frame and a headband. The head frame abuts against two opposite sides of a head and a forehead of a user. The headband is connected with two opposite ends of the head frame. The headband surrounds a rear of the head of the user, and the headband abuts against the rear of the head of the user. The two opposite ends of the head frame have two through holes penetrating through the two opposite ends of the head frame, respectively. Two opposite ends of the headband have two hook and loop fasteners, respectively. One ends of the two hook and loop fasteners are defined as two free ends of the two hook and loop fasteners. The one ends of the two hook and loop fasteners of the two opposite ends of the headband pass through the two through holes, respectively, and then the one ends of the two hook and loop fasteners of the two opposite ends of the headband are folded towards the other ends of the two hook and loop fasteners to make the one ends of the two hook and loop fasteners adhered to the other ends of the two hook and loop fasteners, so that a length of the headband is adjustable.

However, when the headband is pulled by an external force, the two hook and loop fasteners are easily torn from the headband on account of insufficient combining forces of the two hook and loop fasteners on the headband, the two hook and loop fasteners of the two opposite ends of the headband break away from the two through holes to affect a stability between the headband and the head frame, and then an inconvenience of the user is caused. Furthermore, after the conventional headband adjusting assembly is worn to the head of the user, the length of the headband is hardly adjusted by virtue of designs of the two hook and loop fasteners, in that case, if the user wants to adjust the length of the headband slightly, the user need take off the conventional headband adjusting assembly to adjust the length of the headband.

In view of the above-mentioned drawbacks, it is essential to provide an innovative headband adjusting assembly which is applied in a head-mounted display device. The headband adjusting assembly adjusts an overall length of a headband unit conveniently, and the headband adjusting assembly has an advantage of improving a wearing stability of the head-mounted display device.

BRIEF SUMMARY OF THE INVENTION

An object of the present invention is to provide a headband adjusting assembly applied in a head-mounted display device. The headband adjusting assembly includes a main body, an isolating plate, a first headband and a second headband. An inside of the main body has an accommodating space. Two sides of the main body define two openings penetrating through two outer side surfaces of the main body. The accommodating space is communicated with the two openings. The isolating plate is accommodated in the accommodating space. Two sides of a rear surface of the isolating plate protrude rearward to form a first elastic block and a second elastic block. The first elastic block and the second elastic block are exposed out of the two openings, respectively. The first headband is disposed to one side of the main body. The first headband has a first adjusting portion. The first adjusting portion is accommodated in the accommodating space. The first adjusting portion passes through the two openings. Two opposite sides of the first adjusting portion are exposed out of the two openings, respectively. The first adjusting portion has a first buckling portion. The first elastic block is elastically buckled with or breaks away from the first buckling portion. The second headband is disposed to the other side of the main body. The first headband and the second headband are disposed oppositely. The second headband has a second adjusting portion. The second adjusting portion is accommodated in the accommodating space. The second adjusting portion passes through the two openings. Two opposite sides of the second adjusting portion are exposed out of the two openings, respectively. The second adjusting portion has a second buckling portion. The second elastic block is elastically buckled with or breaks away from the second buckling portion.

Another object of the present invention is to provide a headband adjusting assembly connected with a displayer of a head-mounted display device. The headband adjusting assembly includes a main body, an isolating plate, a first headband and a second headband. Two sides of the main body define a first opening penetrating through an outer surface of one side of the main body, and a second opening penetrating through an outer surface of the other side of the main body. An inside of the main body has an accommodating space. The accommodating space is communicated with the first opening and the second opening. The isolating plate is accommodated in the accommodating space. The isolating plate has a base plate. A middle of one side of the base plate extends outward to form a first elastic arm. A middle of the other side of the base plate extends outward to form a second elastic arm. The second elastic arm is opposite to the first elastic arm. A rear surface of the first elastic arm extends rearward to form a first elastic block. A rear surface of the second elastic arm extends rearward to form a second elastic block. The second elastic block is opposite to the first elastic block. The first elastic arm and the first elastic block are disposed at an outside of the first opening. The second elastic arm and the second elastic block are disposed at an outside of the second opening. The first headband is disposed to one side of the main body. Two opposite ends of the first headband have a first connecting portion and a first adjusting portion. The first connecting portion is connected with one side of the displayer. The first adjusting portion is inserted into the accommodating space from the first opening, and the first adjusting portion passes through the second opening to project out of the accommodating space. The first adjusting portion has a plurality of first penetrating grooves penetrating through an outer surface and an inner surface of the first adjusting portion. The second headband is disposed to the other side of the main body. The first headband and the second headband are disposed oppositely. Two opposite ends of the second headband have a second connecting portion and a second adjusting portion. The second connecting portion is connected with the other side of the displayer. The second adjusting portion is inserted into the accommodating space from the second opening, and the second adjusting portion passes through the first opening to project out of the accommodating space. The second adjusting portion has a plurality of second penetrating grooves penetrating through an outer surface and an inner surface of the second adjusting portion. The first elastic block is buckled with or breaks away from one of the plurality of the first penetrating grooves, the second elastic block is buckled with or breaks away from another one of the plurality of the second penetrating grooves.

Another object of the present invention is to provide a headband adjusting assembly. The headband adjusting assembly includes a main body, an isolating plate, a first headband and a second headband. Two sides of the main body define a first opening penetrating through an outer surface of one side of the main body, and a second opening penetrating through an outer surface of the other side of the main body. The second opening is opposite to the first opening. An inside of the main body has an accommodating space. The accommodating space is communicated with the first opening and the second opening. The isolating plate is accommodated in the accommodating space. The isolating plate has a base plate. A middle of one side of the base plate extends outward to form a first elastic arm. A middle of the other side of the base plate extends outward to form a second elastic arm. A rear surface of the first elastic arm extends rearward to form a first elastic block. A front surface of the first elastic arm protrudes frontward to form a first operation portion. An outer surface of the first operation portion is recessed inward to form a first concave groove. A rear surface of the second elastic arm extends rearward to form a second elastic block. A front surface of the second elastic arm protrudes frontward to form a second operation portion. An outer surface of the second operation portion is recessed inward to form a second concave groove. The first elastic arm, the first operation portion and the first elastic block are disposed outside of the first opening. The second elastic arm, the second operation portion and the second elastic block are disposed outside of the second opening. The first headband is disposed to one side of the main body. The first headband has a first adjusting portion. The first adjusting portion is inserted into the accommodating space from the first opening, and the first adjusting portion passes through the second opening to project out of the accommodating space. The first adjusting portion has a plurality of first penetrating grooves penetrating through an outer surface and an inner surface of the first adjusting portion. The second headband is disposed to the other side of the main body. The second headband has a second adjusting portion. The second adjusting portion is inserted into the accommodating space from the second opening, and the second adjusting portion passes through the first opening to project out of the accommodating space. The second adjusting portion has a plurality of second penetrating grooves penetrating through an outer surface and an inner surface of the second adjusting portion. The first elastic block is buckled with or breaks away from any one of the plurality of the first penetrating grooves, the second elastic block is buckled with or breaks away from any one of the plurality of the second penetrating grooves.

As described above, the headband adjusting assembly has the two openings penetrating through a left surface and a right surface of the main body, the isolating plate disposed in the main body, and the first headband and the second headband connected between the main body of the headband adjusting assembly and the displayer, the first elastic block and the second elastic block are disposed at two opposite sides of the isolating plate, the first elastic block elastically moves with respect to the first headband, and the second elastic block elastically moves with respect to the second headband. Furthermore, the first adjusting portion passes through the one opening to be inserted into a receiving groove, the first adjusting portion passes through the other opening to project out of the receiving groove, the second adjusting portion passes through the other opening to be inserted into the receiving groove, and the second adjusting portion passes through the one opening to project out of the receiving groove, so a user pulls the first adjusting portion and the second adjusting portion towards different directions to adjust a wearing space so as to make the first headband and the second headband of a headband unit attached to a head of the user more tightly or more loosely. In addition, the first elastic block is cooperated with the first buckling portion, the first elastic block is buckled with the first buckling portion, the second elastic block is cooperated with the second buckling portion, and the second buckling portion is buckled with the second elastic block, so that a loosening problem of the first headband and the second headband is prevented from being caused. As a result, the headband adjusting assembly is applied in the head-mounted display device, the headband adjusting assembly adjusts an overall length of the headband unit conveniently, and the headband adjusting assembly has an advantage of improving a wearing stability of the head-mounted display device.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
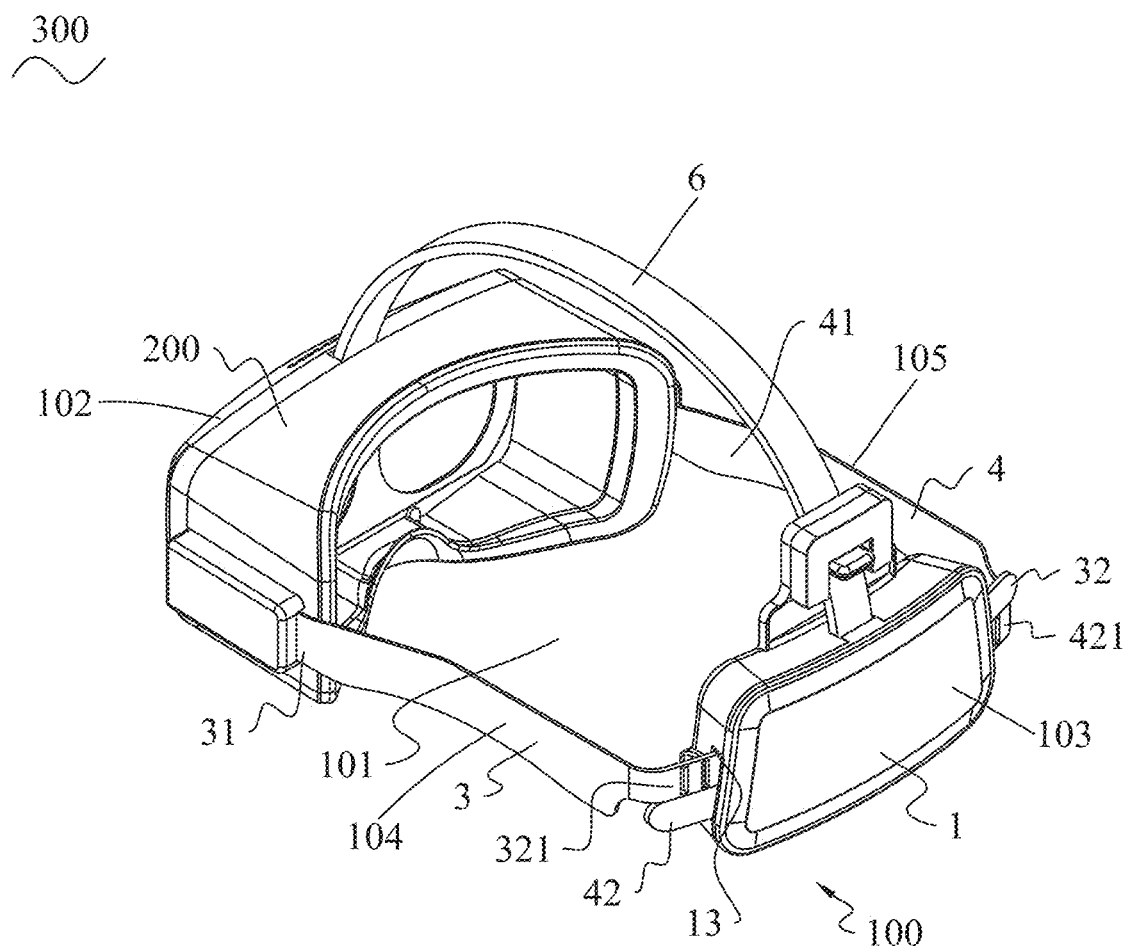
FIG. 1 is a perspective view of a headband adjusting assembly, wherein the headband adjusting assembly is assembled with a displayer of a head-mounted display device according to the present invention.
Figure 2:
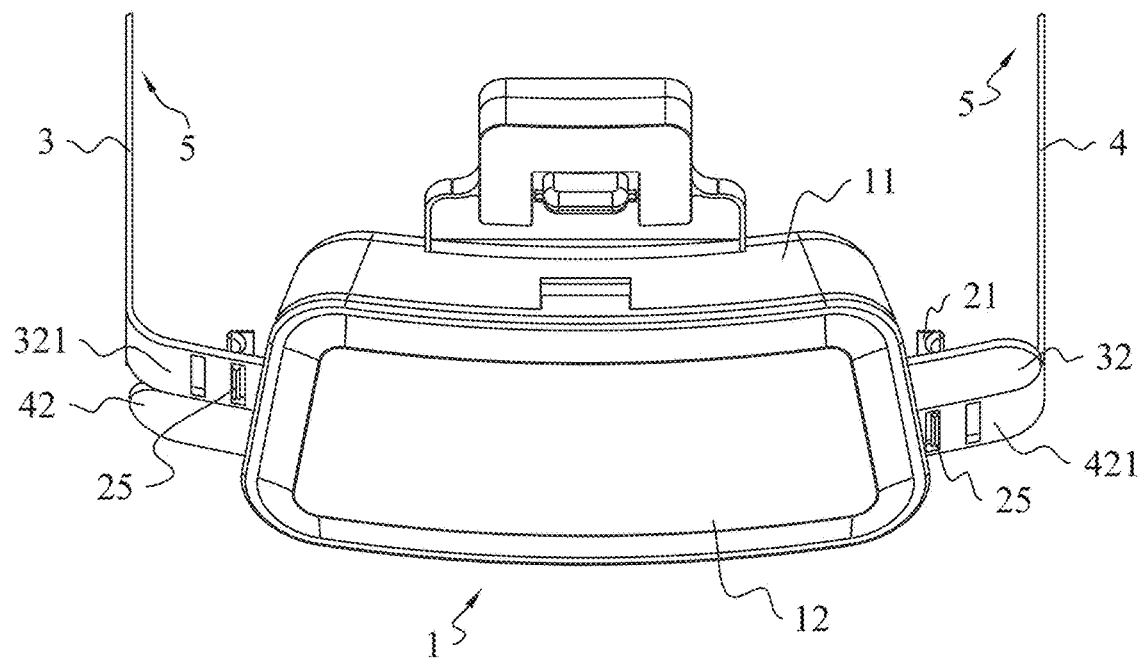
FIG. 2 is a perspective view of the headband adjusting assembly of FIG. 1.
Figure 3:
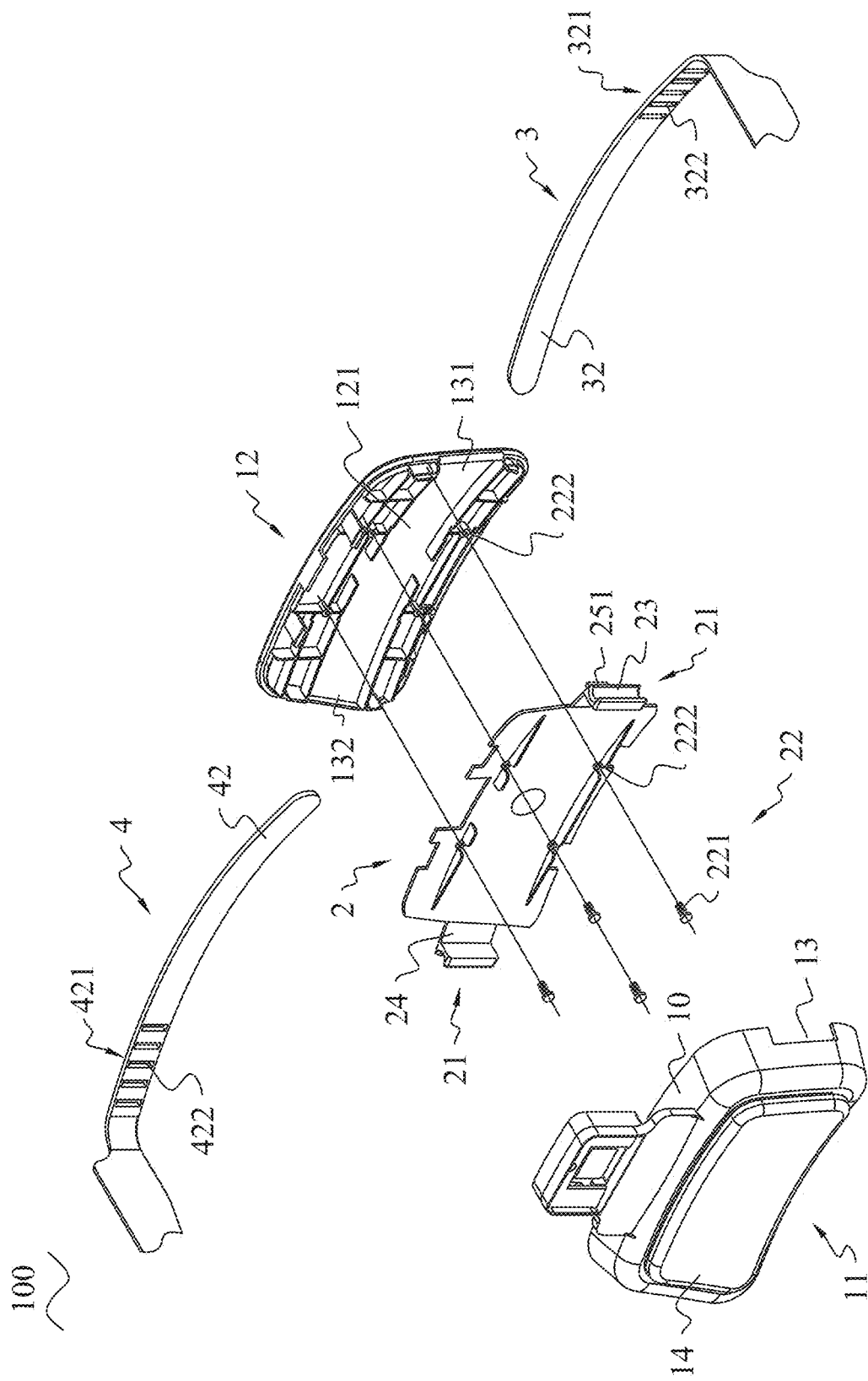
FIG. 3 is an exploded view of the headband adjusting assembly of FIG. 2.

With reference to FIG. 1 to FIG. 3, a headband adjusting assembly 100 in accordance with the present invention is shown. The headband adjusting assembly 100 is applied in a head-mounted display device 300. The headband adjusting assembly 100 is connected with a displayer 200 of the head-mounted display device 300. The headband adjusting assembly 100 is configured to be worn on a head of a user. The displayer 200 is correspondingly fixed in front of two eyes of the user. The headband adjusting assembly 100 includes a main body 1, an isolating plate 2, a headband unit 5 and an upper headband 6. The headband unit 5 includes a first headband 3 and a second headband 4. The headband adjusting assembly 100 and the displayer 200 are disposed opposite to each other. The displayer 200 is located in front of the headband adjusting assembly 100. The first headband 3 and the second headband 4 are connected between the main body 1 of the headband adjusting assembly 100 and the displayer 200. The upper headband 6 is connected between two tops of the main body 1 and the displayer 200.

Referring to FIG. 1, a front surface of the displayer 200 is defined as a front surface 102. A rear surface of the headband adjusting assembly 100 is defined as a rear surface 103. The front surface 102 and the rear surface 103 are disposed oppositely. An outer side surface of the first headband 3 is defined as a left surface 104. An outer side surface of the second headband 4 is defined as a right surface 105. The left surface 104 and the right surface 105 are disposed oppositely.

Referring to FIG. 1 and FIG. 3, the isolating plate 2 is disposed in the main body 1. The first headband 3 is disposed to one side of the main body 1. Two opposite ends of the first headband 3 are connected with two sides of the main body 1 of the headband adjusting assembly 100 and the displayer 200, respectively. Two opposite ends of the second headband 4 are connected with the other two sides of the main body 1 of the headband adjusting assembly 100 and the displayer 200, respectively. The first headband 3 is disposed between a left side of the main body 1 of the headband adjusting assembly 100 and a left side of the displayer 200. The second headband 4 is disposed to the other side of the main body 1. The second headband 4 is disposed between a right side of the main body 1 of the headband adjusting assembly 100 and a right side of the displayer 200. The first headband 3 and the second headband 4 are disposed oppositely. The first headband 3, the main body 1, the second headband 4 and the displayer 200 surround a wearing space 101. The headband adjusting assembly 100 is worn to the head of the user, and the head of the user is in the wearing space 101. The first headband 3 is a flexible band structure, so that the first headband 3 is flexibly attached to one side of the head of the user along a head circumference of the user. The second headband 4 is the flexible band structure, so that the second headband 4 is flexibly attached to the other side of the head of the user along the head circumference of the user.

Referring to FIG. 1 to FIG. 3, an inside of the main body 1 has an accommodating space 10. Two sides of the main body 1 define two openings 13 penetrating through two outer side surfaces of the main body 1. The main body 1 includes a shell 11 and a cover 12. The shell 11 faces towards the displayer 200. The cover 12 is away from the displayer 200. A rear of the shell 11 is opened freely. The cover 12 is covered to the rear of the shell 11 to form the accommodating space 10 between the shell 11 and the cover 12. The accommodating space 10 is formed in the main body 1. The two openings 13 transversely penetrate through two middles of two sides of the shell 11 and two middles of two sides of the cover 12. The two openings 13 include a first opening 131 disposed at a left side of the main body 1, and a second opening 132 disposed at a right side of the main body 1. The second opening 132 is opposite to the first opening 131. The two sides of the main body 1 define the first opening 131 penetrating through an outer surface of the one side of the main body 1, and the second opening 132 penetrating through an outer surface of the other side of the main body 1.

The two openings 13 penetrate through a middle of a left surface and a middle of a right surface of the shell 11. The two openings 13 penetrate through a middle of a left surface and a middle of a right surface of the cover 12. The two openings 13 penetrate through a middle of the left surface and a middle of the right surface of the main body 1. The accommodating space 10 is communicated with the two openings 13. The isolating plate 2 is mounted in the accommodating space 10. The isolating plate 2 is fastened to a front surface of the cover 12. A protective pad 14 is disposed to a front of the shell 11, and the protective pad 14 faces towards the rear of the head of the user. The protective pad 14 abuts against the rear of the head of the user. In a concrete implementation, the protective pad 14 is made of a silicone material, a rubber material, a foam material or any soft materials. A comfortable feeling of wearing the head-mounted display device 300 is increased by the protective pad 14.

The front surface of the cover 12 is recessed rearward to form a receiving groove 121. The isolating plate 2 is accommodated in the accommodating space 10. The isolating plate 2 is spaced from the front surface of the cover 12. The receiving groove 121 is formed between the isolating plate 2 and the front surface of the cover 12. The accommodating space 10 includes the receiving groove 121. Two opposite sides of the receiving groove 121 are communicated with the two openings 13. The first opening 131 and the second opening 132 are disposed oppositely. The two opposite sides of the accommodating space 10 are communicated with the first opening 131 and the second opening 132.

Figure 4:
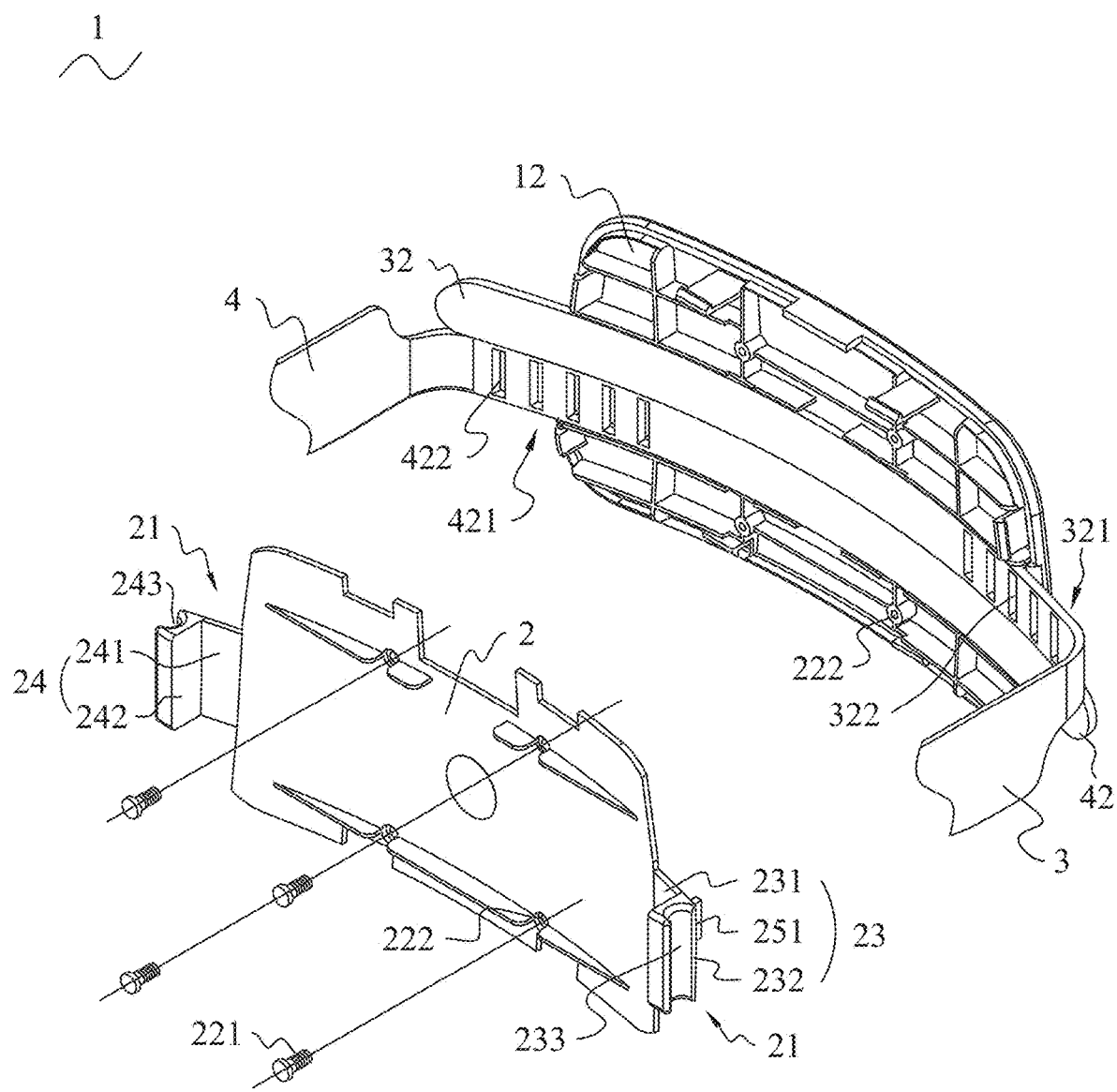
FIG. 4 is a partially exploded view of the headband adjusting assembly of FIG. 2.
Figure 5:
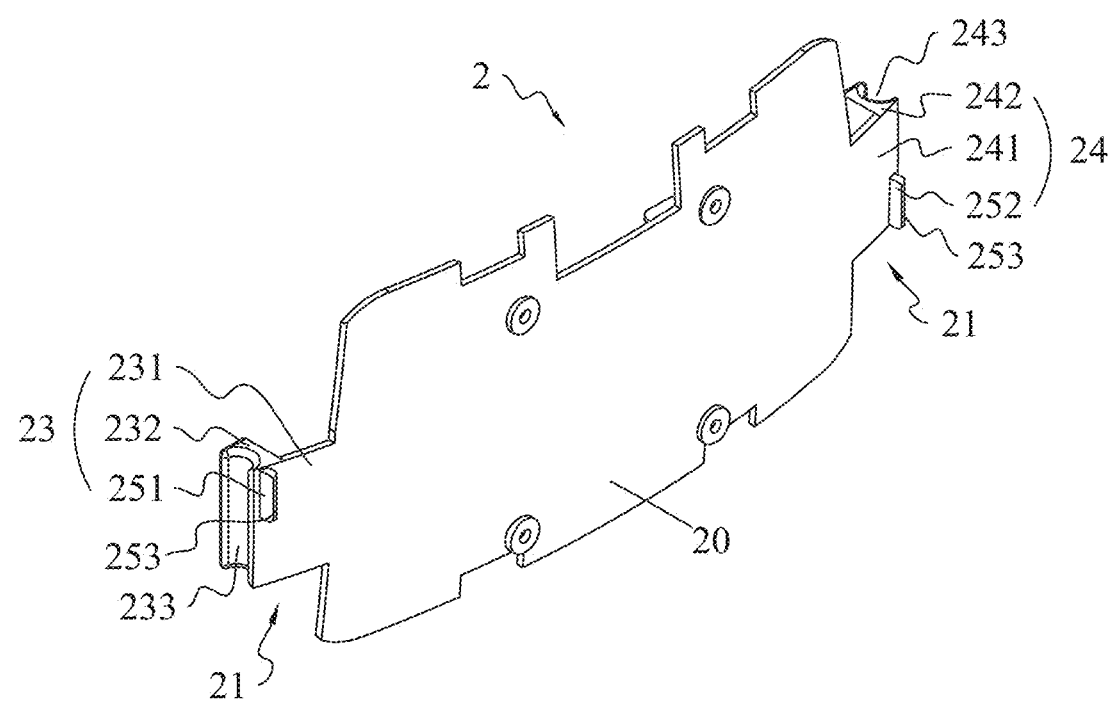
FIG. 5 is a perspective view of an isolating plate of the headband adjusting assembly of FIG. 2.

Referring to FIG. 3 to FIG. 5, the isolating plate 2 has a base plate 20 and two elastic structures 21. Two opposite sides of the base plate 20 of the isolating plate 2 extend outward to form the two elastic structures 21. The two elastic structures 21 are exposed out of the two openings 13 of the main body 1. The two elastic structures 21 are corresponding to an inner surface of the first headband 3 and an inner surface of the second headband 4, respectively. The two elastic structures 21 are used for adjusting a length of the first headband 3 and a length of the second headband 4. The two elastic structures 21 are able to elastically deform with respect to the first headband 3 and the second headband 4. The headband adjusting assembly 100 further includes a fastening module 22. Specifically, the headband adjusting assembly 100 includes a plurality of the fastening modules 22. The fastening module 22 is formed at the base plate 20 of the isolating plate 2 and the cover 12 of the main body 1.

With reference to FIG. 1 to FIG. 4, an upper portion and a lower portion of two sides of a rear surface of the isolating plate 2 protrude rearward to form two elastic blocks 25. The headband unit 5 is matched with the two elastic blocks 25. The headband unit 5 is combined with the two elastic blocks 25. The two elastic blocks 25 are exposed out of the two openings 13 of main body 1. The two elastic blocks 25 include a first elastic block 251 and a second elastic block 252. The upper portion and the lower portion of the two sides of the rear surface of the isolating plate 2 protrude rearward to form the first elastic block 251 and the second elastic block 252. The first elastic block 251 and the second elastic block 252 are disposed at two opposite sides of the isolating plate 2, the first elastic block 251 elastically moves with respect to the first headband 3, and the second elastic block 252 elastically moves with respect to the second headband 4.

The first elastic block 251 and the second elastic block 252 are exposed out of the two openings 13, respectively. Specifically, the first elastic block 251 is disposed to a left side of the base plate 20 of the isolating plate 2. The second elastic block 252 is disposed to a right side of the base plate 20 of the isolating plate 2. The first elastic block 251 is corresponding to a corresponding mechanism of the first headband 3 to realize that the first headband 3 is located to the isolating plate 2, and the first headband 3 is fixed to the isolating plate 2. The second elastic block 252 is corresponding to a corresponding mechanism of the second headband 4 to realize that the second headband 4 is located to the isolating plate 2, and the second headband 4 is fixed to the isolating plate 2.

One end of the first headband 3 and one end of the second headband 4 which are adjacent to the main body 1 are movably disposed in the receiving groove 121. The one end of the first headband 3 has a first buckling portion 321. The one end of the second headband 4 has a second buckling portion 421. The user is able to buckle the first elastic block 251 and the second elastic block 252 of the two opposite sides of the isolating plate 2 in appropriate positions of the first buckling portion 321 and the second buckling portion 421 according to a size of the head circumference of the user, so that the wearing space 101 is changed to adjust an overall length of the headband unit 5. The first elastic block 251 and the second elastic block 252 are limited in the first buckling portion 321 and the second buckling portion 421 to prevent causing a loosening problem of the first headband 3 and the second headband 4 which are adjusted.

The two elastic structures 21 include a first elastic structure 23 and a second elastic structure 24. The first elastic structure 23 and the second elastic structure 24 are extended outward from two sides of the isolating plate 2. The first elastic structure 23 is opposite to the second elastic structure 24. The first elastic structure 23 is disposed to the left side of the base plate 20 of the isolating plate 2. The first elastic structure 23 is exposed out of the first opening 131 of the main body 1. The first elastic structure 23 is corresponding to the inner surface of the first headband 3. The second elastic structure 24 is disposed to the right side of the base plate 20 of the isolating plate 2. The second elastic structure 24 is exposed out of the second opening 132 of the main body 1. The second elastic structure 24 is corresponding to the inner surface of the second headband 4.

The first elastic structure 23 has a first elastic arm 231, a first operation portion 232 and a first concave groove 233. A middle of one side of the base plate 20 of the isolating plate 2 extends outward to form the first elastic arm 231. The first elastic block 251 is disposed at a rear surface of the first elastic arm 231. A middle of the left side of the base plate 20 of the isolating plate 2 extends outward to form the first elastic arm 231. An upper portion of the rear surface of the first elastic arm 231 extends rearward to form the first elastic block 251. The first elastic block 251 is disposed to an outer side of the first elastic arm 231. The first elastic arm 231 and the first elastic block 251 are disposed at an outside of the first opening 131 of main body 1. In the concrete implementation, the first elastic block 251 is without being limited to be extended rearward from the upper portion of the rear surface of the first elastic arm 231.

Referring to FIG. 3 to FIG. 5, the cover 12 is combined with the isolating plate 2 by the plurality of the fastening modules 22. The cover 12 is correspondingly fastened with the isolating plate 2 by the plurality of the fastening modules 22. Each fastening module 22 includes a fastening element 221 and two location holes 222. One location hole 222 penetrates through a front surface and the rear surface of the base plate 20 of the isolating plate 2. The other location hole 222 penetrates through the front surface of the cover 12. The fastening element 221 is corresponding to the location hole 222 of the base plate 20 of the isolating plate 2 and the location hole 222 of the cover 12. The fastening element 221 is fastened in the location hole 222 of the base plate 20 of the isolating plate 2 and the location hole 222 of the cover 12, so that the isolating plate 2 is fastened to the cover 12, and the isolating plate 2 is combined with the cover 12.

A front surface of a free end of the first elastic arm 231 protrudes frontward to form the first operation portion 232. A rear surface of the free end of the first elastic arm 231 protrudes rearward to form the first elastic block 251. The first elastic block 251 is formed at the free end of the first elastic arm 231. One side of a front surface of the first elastic arm 231 of the isolating plate 2 protrudes frontward and opposite to the cover 12 to form the first operation portion 232. The first elastic block 251 is protruded rearward and towards the first headband 3 from one side of the rear surface of the first elastic arm 231 of the isolating plate 2. The first elastic block 251 is cooperated with the first buckling portion 321. The first elastic block 251 is assembled with the first buckling portion 321. The free end of the first elastic arm 231 elastically moves with respect to the first headband 3. The first elastic block 251 is elastically buckled with or breaks away from the first buckling portion 321 of the first headband 3. The first operation portion 232 and the first elastic block 251 are disposed oppositely. The first elastic arm 231, the first operation portion 232 and the first elastic block 251 are disposed outside of the first opening 131 of main body 1. An outer surface of the first operation portion 232 is recessed inward to form the first concave groove 233. A finger of the user stirs the first elastic structure 23 conveniently by the first concave groove 233, so that the first elastic structure 23 breaks away from the first headband 3.

The second elastic structure 24 has a second elastic arm 241, a second operation portion 242 and a second concave groove 243. A middle of the other side of the base plate 20 of the isolating plate 2 extends outward to form the second elastic arm 241. The second elastic arm 241 is opposite to the first elastic arm 231. A front surface of the second elastic arm 241 is smoothly connected with the front surface of the first elastic arm 231 and a front surface of the base plate 20 of the isolating plate 2. A rear surface of the second elastic arm 241 is smoothly connected with the rear surface of the first elastic arm 231 and the rear surface of the base plate 20 of the isolating plate 2. The second elastic block 252 is disposed at the rear surface of the second elastic arm 241. A middle of the right side of the base plate 20 of the isolating plate 2 extends outward to form the second elastic arm 241. A lower portion of the rear surface of the second elastic arm 241 extends rearward to form the second elastic block 252. The second elastic block 252 is opposite to the first elastic block 251. The second elastic block 252 is disposed to an outer side of the second elastic arm 241. The second elastic arm 241 and the second elastic block 252 are disposed at an outside of the second opening 132 of main body 1. In the concrete implementation, the second elastic block 252 is without being limited to be extended rearward from the lower portion of the rear surface of the second elastic arm 241.

A front surface of a free end of the second elastic arm 241 protrudes frontward to form the second operation portion 242. A rear surface of the free end of the second elastic arm 241 protrudes rearward to form the second elastic block 252. The second elastic block 252 is formed at the free end of the second elastic arm 241. One side of a front surface of the second elastic arm 241 of the isolating plate 2 protrudes frontward and opposite to the cover 12 to form the second operation portion 242. The second elastic block 252 is protruded rearward and towards the second headband 4 from one side of the rear surface of the second elastic arm 241 of the isolating plate 2. The second elastic block 252 is cooperated with the second buckling portion 421, and the second elastic block 252 is assembled with the second buckling portion 421. The free end of the second elastic arm 241 elastically moves with respect to the second headband 4. The second elastic block 252 is elastically buckled with or breaks away from the second buckling portion 421 of the second headband 4. The second operation portion 242 and the second elastic block 252 are disposed oppositely. The second elastic arm 241, the second operation portion 242 and the second elastic block 252 are disposed outside of the second opening 132 of main body 1. An outer surface of the second operation portion 242 is recessed inward to form the second concave groove 243. The first concave groove 233 and the second concave groove 243 are disposed oppositely. The finger of the user stirs the second elastic structure 24 conveniently by the second concave groove 243, so that the second elastic structure 24 breaks away from the second headband 4. The finger of the user stirs the two elastic structures 21 conveniently by the first concave groove 233 and the second concave groove 243.

The first elastic block 251 is disposed at an upper portion of one side of the first elastic arm 231 which is away from the second elastic arm 241. The second elastic block 252 is disposed at a lower portion of one side of the second elastic arm 241 which is away from the first elastic block 251. The first elastic block 251 is formed at the upper portion of the one side of the first elastic arm 231 of the isolating plate 2. The second elastic block 252 is formed at the lower portion of the one side of the second elastic arm 241 of the isolating plate 2.

Figure 6:
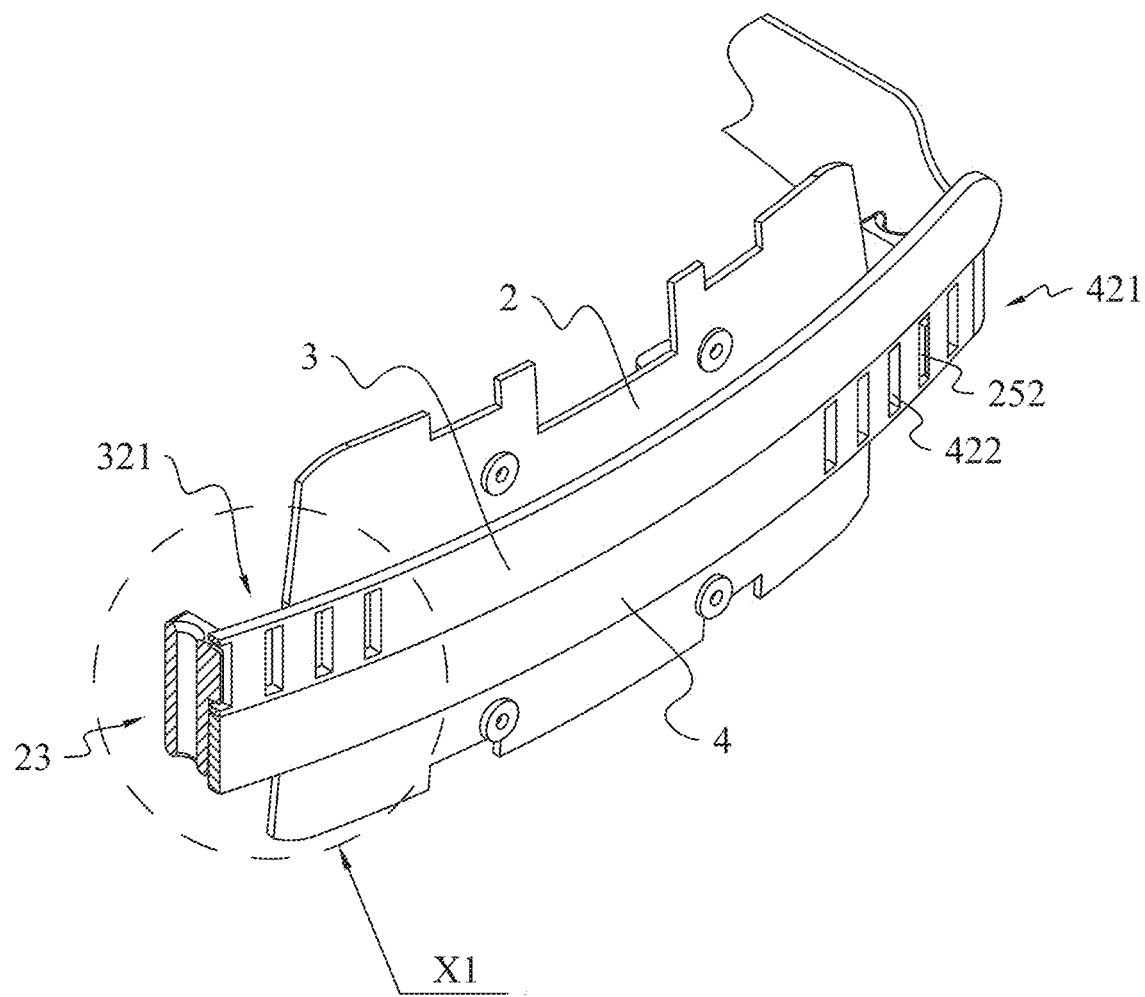
FIG. 6 is a partially sectional view of the headband adjusting assembly of FIG. 2.
Figure 7:
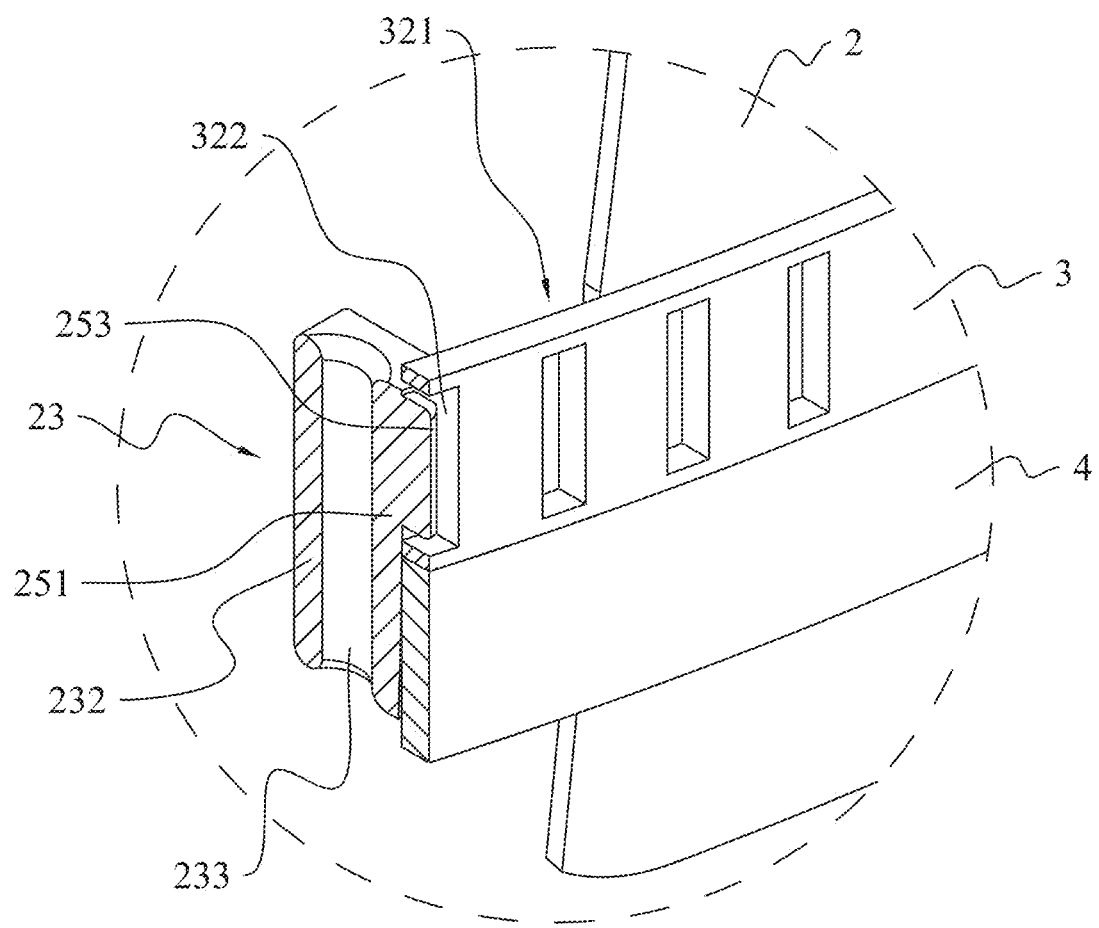
FIG. 7 is an enlarged view of an encircled portion X1 of the headband adjusting assembly of FIG. 6.

Referring to FIG. 5 to FIG. 7, a rear of the first elastic block 251 has a guiding surface 253. A rear of the second elastic block 252 has the guiding surface 253. A periphery of the first elastic block 251 slantwise extends rearward and inward to form the guiding surface 253. A periphery of the second elastic block 252 slantwise extends rearward and inward to form the guiding surface 253. The guiding surface 253 of the first elastic block 251 is used for guiding the first elastic block 251 to be separated from the first headband 3. The guiding surface 253 of the second elastic block 252 is used for guiding the second elastic block 252 to be separated from the second headband 4.

Referring to FIG. 1 to FIG. 5, the two opposite ends of the first headband 3 have a first connecting portion 31 and a first adjusting portion 32. The first connecting portion 31 is connected with one side of the displayer 200. The first connecting portion 31 is connected with the left side of the displayer 200. The first connecting portion 31 of the first headband 3 extends frontward. The first adjusting portion 32 of the first headband 3 is extended rightward from a rear end of the first connecting portion 31. The first adjusting portion 32 is accommodated in the accommodating space 10. The first adjusting portion 32 passes through the two openings 13. Two opposite sides of the first adjusting portion 32 is exposed out of the two openings 13, respectively. The first adjusting portion 32 passes through one opening 13 to be inserted into the accommodating space 10, and the first adjusting portion 32 passes through the other opening 13 to project out of the accommodating space 10. The first adjusting portion 32 is inserted into the receiving groove 121 of the accommodating space 10 from the first opening 131 of the main body 1, and the first adjusting portion 32 passes through the second opening 132 of the main body 1 to project out of the receiving groove 121 of the accommodating space 10. The first adjusting portion 32 is received in an upper portion of the receiving groove 121 of the cover 12 of the main body 1.

The first adjusting portion 32 has the first buckling portion 321. The first buckling portion 321 is formed to the one end of the first adjusting portion 32. The first buckling portion 321 is corresponding to one elastic structure 21 of the one side of the base plate 20 of the isolating plate 2. The first buckling portion 321 is buckled with the one elastic structure 21 of the one side of the base plate 20 of the isolating plate 2. The first buckling portion 321 is corresponding to the first elastic structure 23 of the isolating plate 2. The first buckling portion 321 is buckled with the first elastic structure 23 of the isolating plate 2. The first elastic block 251 faces towards one side of the first adjusting portion 32 which has the first buckling portion 321. The first buckling portion 321 is buckled with the first elastic block 251. The first buckling portion 321 is used for restricting the first elastic block 251 of the isolating plate 2, so that the first buckling portion 321 prevents the first headband 3 from being loosened.

The first adjusting portion 32 has a plurality of first penetrating grooves 322 penetrating through an outer surface and an inner surface of the first adjusting portion 32. The first buckling portion 321 of the first adjusting portion 32 has the plurality of first penetrating grooves 322 penetrating through an outer surface and an inner surface of the first buckling portion 321. The first adjusting portion 32 is received in the upper portion of the receiving groove 121 of the cover 12 of the main body 1, so that the first elastic block 251 of the isolating plate 2 is buckled with one first penetrating groove 322. The first elastic block 251 of the isolating plate 2 is buckled with or breaks away from any one of the plurality of the first penetrating grooves 322, so that a length of the first headband 3 is adjusted by the user, and the first headband 3 is prevented from being loosened.

The two opposite ends of the second headband 4 has a second connecting portion 41 and a second adjusting portion 42. The first connecting portion 31 and the second connecting portion 41 are connected with two opposite sides of the displayer 200. The first connecting portion 31 and the second connecting portion 41 are fastened with the two opposite sides of the displayer 200. The second connecting portion 41 of the second headband 4 extends frontward. The second connecting portion 41 is connected with the other side of the displayer 200. The second connecting portion 41 is connected with the right side of the displayer 200. The second connecting portion 41 is corresponding to the first connecting portion 31 of the first headband 3. The second adjusting portion 42 is accommodated in the accommodating space 10. The second adjusting portion 42 passes through the two openings 13. Two opposite sides of the second adjusting portion 42 is exposed out of the two openings 13, respectively. The second adjusting portion 42 passes through the other opening 13 to be inserted into the accommodating space 10, and the second adjusting portion 42 passes through the one opening 13 to project out of the accommodating space 10. The first adjusting portion 32 passes through the one opening 13 to be inserted into the receiving groove 121, and the first adjusting portion 32 passes through the other opening 13 to project out of the receiving groove 121. The second adjusting portion 42 passes through the other opening 13 to be inserted into the receiving groove 121, and the second adjusting portion 42 passes through the one opening 13 to project out of the receiving groove 121.

The second adjusting portion 42 of the second headband 4 is extended leftward from a rear end of the second connecting portion 41. The second adjusting portion 42 is inserted into the receiving groove 121 of the accommodating space 10 from the second opening 132 of the main body 1, and the second adjusting portion 42 passes through the first opening 131 of the main body 1 to project out of the receiving groove 121 of the accommodating space 10. The second adjusting portion 42 is received in a lower portion of the receiving groove 121 of the cover 12 of the main body 1. The first adjusting portion 32 is stacked on the second adjusting portion 42 along an up-down direction. The first adjusting portion 32 is aligned with the second adjusting portion 42 along the up-down direction. The first adjusting portion 32 is overlapped with the second adjusting portion 42 along the up-down direction. The first adjusting portion 32 and the second adjusting portion 42 are movably received in the receiving groove 121 between the cover 12 of the main body 1 and the isolating plate 2.

The second adjusting portion 42 has the second buckling portion 421. The second buckling portion 421 is formed to one end of the second adjusting portion 42. The second buckling portion 421 is corresponding to the other elastic structure 21 of the other side of the base plate 20 of the isolating plate 2. The second buckling portion 421 is buckled with the other elastic structure 21 of the other side of the base plate 20 of the isolating plate 2. The second elastic block 252 faces towards one side of the second adjusting portion 42 which has the second buckling portion 421. The second buckling portion 421 is buckled with the second elastic block 252. The second buckling portion 421 is corresponding to the second elastic structure 24 of the isolating plate 2. The second buckling portion 421 is buckled with the second elastic structure 24 of the isolating plate 2. The second buckling portion 421 is used for restricting the second elastic block 252 of the isolating plate 2, so that the second buckling portion 421 prevents the second headband 4 from being loosened.

The second adjusting portion 42 has a plurality of second penetrating grooves 422 penetrating through an outer surface and an inner surface of the second adjusting portion 42. The second buckling portion 421 of the second adjusting portion 42 has a plurality of second penetrating grooves 422 penetrating through an outer surface and an inner surface of the second buckling portion 421. The second adjusting portion 42 is received in the lower portion of the receiving groove 121 of the cover 12 of the main body 1, so that the second elastic block 252 of the isolating plate 2 is buckled with one second penetrating groove 422. The second elastic block 252 of the isolating plate 2 is buckled with or breaks away from any one of the plurality of the second penetrating grooves 422, so that a length of the second headband 4 is adjusted by the user, and the second headband 4 is prevented from being loosened. The overall length of the headband unit 5 is adjusted by virtue of adjusting the length of the first headband 3 and the length of the second headband 4. The first elastic block 251 is buckled with or breaks away from one of the plurality of the first penetrating grooves 322 and the second penetrating grooves 422. The second elastic block 252 is buckled with or breaks away from another one of the plurality of the first penetrating grooves 322 and the second penetrating grooves 422.

Referring to FIG. 1 to FIG. 7, when the first adjusting portion 32 is pulled towards a rightward direction by the user, the first headband 3 moves rightward. The first elastic block 251 is guided by the guiding surface 253 of the first elastic block 251 to make the first elastic block 251 slide out of the plurality of the first penetrating grooves 322. The length of the first headband 3 is adjusted, the wearing space 101 becomes smaller, so the first headband 3 is attached to the head of the user more tightly. When the second adjusting portion 42 is pulled towards a leftward direction by the user, the second headband 4 moves leftward. The second elastic block 252 is guided by the guiding surface 253 of the second elastic block 252 to make the second elastic block 252 slide out of the plurality of the second penetrating grooves 422. The length of the second headband 4 is adjusted, the wearing space 101 becomes smaller, so the second headband 4 is attached to the head of the user more tightly. The first headband 3 and the second headband 4 adjust the overall length of the headband unit 5 to enlarge or reduce the wearing space 101 according to the size of the head circumference of the user.

When the user wants to take off the head-mounted display device 300, the finger of the user stirs the first operation portion 232 of the first elastic structure 23 by the first concave groove 233, so the first elastic structure 23 is elastically deformed to break away from the first headband 3. The first elastic block 251 breaks away from the first buckling portion 321 of the first headband 3, and the first elastic block 251 is separated from the plurality of the first penetrating grooves 322 by the guiding surface 253 of the first elastic block 251. At the moment, the first headband 3 of the headband unit 5 is released to be pulled outward, the length of the first headband 3 is adjusted, the wearing space 101 becomes bigger, so the first headband 3 is attached to the head of the user more loosely. The finger of the user stirs the second operation portion 242 of the second elastic structure 24 by the second concave groove 243, so the second elastic structure 24 is elastically deformed to break away from the second headband 4. The second elastic block 252 breaks away from the second buckling portion 421 of the second headband 4, and the second elastic block 252 is separated from the plurality of the second penetrating grooves 422 by the guiding surface 253 of the second elastic block 252. At the moment, the second headband 4 of the headband unit 5 is released to be pulled outward, the length of the second headband 4 is adjusted, the wearing space 101 becomes bigger, so the second headband 4 is attached to the head of the user more loosely. The user takes off the head-mounted display device 300 conveniently.

Then, when the user releases the first operation portion 232, the first elastic structure 23 is rebounded towards the first headband 3 of the headband unit 5 to be restored to an original position of the first elastic structure 23, so the first elastic structure 23 is close to the first headband 3. The first elastic block 251 is buckled with the first buckling portion 321, so the first elastic block 251 prevents the first headband 3 being completely separated from the main body 1. When the user releases the second operation portion 242, the second elastic structure 24 is rebounded towards the second headband 4 of the headband unit 5 to be restored to an original position of the second elastic structure 24, so the second elastic structure 24 is close to the second headband 4. The second elastic block 252 is buckled with the second buckling portion 421, so the second elastic block 252 prevents the second headband 4 being completely separated from the main body 1. In that case, when the user wears the head-mounted display device 300, the user pulls the headband unit 5 towards different directions to adjust the wearing space 101 so as to make the headband unit 5 attached to the head of the user more tightly or more loosely.

As described above, the headband adjusting assembly 100 has the two openings 13 penetrating through the left surface and the right surface of the main body 1, the isolating plate 2 disposed in the main body 1, and the first headband 3 and the second headband 4 connected between the main body 1 of the headband adjusting assembly 100 and the displayer 200, the first elastic block 251 and the second elastic block 252 are disposed at the two opposite sides of the isolating plate 2, the first elastic block 251 elastically moves with respect to the first headband 3, and the second elastic block 252 elastically moves with respect to the second headband 4. Furthermore, the first adjusting portion 32 passes through the one opening 13 to be inserted into the receiving groove 121, the first adjusting portion 32 passes through the other opening 13 to project out of the receiving groove 121, the second adjusting portion 42 passes through the other opening 13 to be inserted into the receiving groove 121, and the second adjusting portion 42 passes through the one opening 13 to project out of the receiving groove 121, so the user pulls the first adjusting portion 32 and the second adjusting portion 42 towards the different directions to adjust the wearing space 101 so as to make the first headband 3 and the second headband 4 of the headband unit 5 attached to the head of the user more tightly or more loosely. In addition, the first elastic block 251 is cooperated with the first buckling portion 321, the first elastic block 251 is buckled with the first buckling portion 321, the second elastic block 252 is cooperated with the second buckling portion 421, and the second buckling portion 421 is buckled with the second elastic block 252, so that the loosening problem of the first headband 3 and the second headband 4 is prevented from being caused. As a result, the headband adjusting assembly 100 is applied in the head-mounted display device 300, the headband adjusting assembly 100 adjusts the overall length of the headband unit 5 conveniently, and the headband adjusting assembly 100 has an advantage of improving a wearing stability of the head-mounted display device 300.

What is claimed is:

1. A headband adjusting assembly applied in a head-mounted display device, comprising:
    a main body, an inside of the main body having an accommodating space, two sides of the main body defining two openings penetrating through two outer side surfaces of the main body, the accommodating space being communicated with the two openings;
    an isolating plate accommodated in the accommodating space, two sides of a rear surface of the isolating plate protruding rearward to form a first elastic block and a second elastic block, the first elastic block and the second elastic block being exposed out of the two openings, respectively;
    a first headband disposed to one side of the main body, the first headband having a first adjusting portion, the first adjusting portion being accommodated in the accommodating space, the first adjusting portion passing through the two openings, two opposite sides of the first adjusting portion being exposed out of the two openings, respectively, the first adjusting portion having a first buckling portion, the first elastic block being elastically buckled with or breaking away from the first buckling portion; and
    a second headband disposed to the other side of the main body, the first headband and the second headband being disposed oppositely, the second headband having a second adjusting portion, the second adjusting portion being accommodated in the accommodating space, the second adjusting portion passing through the two openings, two opposite sides of the second adjusting portion being exposed out of the two openings, respectively, the second adjusting portion having a second buckling portion, the second elastic block being elastically buckled with or breaking away from the second buckling portion.

2. The headband adjusting assembly as claimed in claim 1, wherein the isolating plate has a base plate, a middle of one side of the base plate extends outward to form a first elastic arm, a middle of the other side of the base plate extends outward to form a second elastic arm, a free end of the first elastic arm elastically moves with respect to the first headband, a free end of the second elastic arm elastically moves with respect to the second headband, a rear surface of the free end of the first elastic arm protrudes rearward to form the first elastic block, a rear surface of the free end of the second elastic arm protrudes rearward to form the second elastic block, the first elastic block faces towards one side of the first adjusting portion which has the first buckling portion, the second elastic block faces towards one side of the second adjusting portion which has the second buckling portion.

3. The headband adjusting assembly as claimed in claim 2, wherein the first elastic block is disposed at an upper portion of one side of the first elastic arm which is away from the second elastic arm, the second elastic block is disposed at a lower portion of one side of the second elastic arm which is away from the first elastic block.

4. The headband adjusting assembly as claimed in claim 2, wherein an upper portion of a rear surface of the first elastic arm extends rearward to form the first elastic block, a lower portion of a rear surface of the second elastic arm extends rearward to form the second elastic block.

5. The headband adjusting assembly as claimed in claim 2, wherein a front surface of the free end of the first elastic arm protrudes frontward to form a first operation portion, the first operation portion and the first elastic block are disposed oppositely, a front surface of the free end of the second elastic arm protrudes frontward to form a second operation portion, the second operation portion and the second elastic block are disposed oppositely.

6. The headband adjusting assembly as claimed in claim 5, wherein an outer surface of the first operation portion is recessed inward to form a first concave groove, an outer surface of the second operation portion is recessed inward to form a second concave groove, the first concave groove and the second concave groove are disposed oppositely.

7. The headband adjusting assembly as claimed in claim 5, wherein the two openings include a first opening disposed at a left side of the main body, and a second opening disposed at a right side of the main body, the first opening and the second opening are disposed oppositely, the first operation portion and the first elastic block are disposed outside of the first opening, the second operation portion and the second elastic block are disposed outside of the second opening.

8. The headband adjusting assembly as claimed in claim 1, wherein the first buckling portion has a plurality of first penetrating grooves penetrating through an outer surface and an inner surface of the first buckling portion, the first elastic block is buckled with one first penetrating groove, the second buckling portion has a plurality of second penetrating grooves penetrating through an outer surface and an inner surface of the second buckling portion, the second elastic block is buckled with one second penetrating groove.

9. The headband adjusting assembly as claimed in claim 8, wherein the main body includes a shell and a cover, the cover is covered to a rear of the shell to form the accommodating space between the shell and the cover, a front surface of the cover is recessed rearward to form a receiving groove, the isolating plate is spaced from the front surface of the cover, the receiving groove is formed between the isolating plate and the front surface of the cover, two opposite sides of the receiving groove are communicated with the two openings, the first adjusting portion is stacked on the second adjusting portion along an up-down direction, the first adjusting portion is aligned with the second adjusting portion along the up-down direction, the first adjusting portion is overlapped with the second adjusting portion along the up-down direction, the first adjusting portion and the second adjusting portion are movably received in the receiving groove.

10. The headband adjusting assembly as claimed in claim 9, wherein the cover is correspondingly fastened with the isolating plate by a plurality of fastening modules, the isolating plate has a base plate, each fastening module includes a fastening element and two location holes, one location hole penetrates through a front surface and a rear surface of the base plate, the other location hole penetrates through the front surface of the cover, the fastening element is fastened in the location hole of the base plate of the isolating plate and the location hole of the cover.

11. A headband adjusting assembly connected with a displayer of a head-mounted display device, the headband adjusting assembly comprising:
a main body, two sides of the main body defining a first opening penetrating through an outer surface of one side of the main body, and a second opening penetrating through an outer surface of the other side of the main body, an inside of the main body having an accommodating space, the accommodating space being communicated with the first opening and the second opening;
an isolating plate accommodated in the accommodating space, the isolating plate having a base plate, a middle of one side of the base plate extending outward to form a first elastic arm, a middle of the other side of the base plate extending outward to form a second elastic arm, the second elastic arm being opposite to the first elastic arm, a rear surface of the first elastic arm extending rearward to form a first elastic block, a rear surface of the second elastic arm extending rearward to form a second elastic block, the second elastic block being opposite to the first elastic block, the first elastic arm and the first elastic block being disposed at an outside of the first opening, the second elastic arm and the second elastic block being disposed at an outside of the second opening;
a first headband disposed to one side of the main body, two opposite ends of the first headband having a first connecting portion and a first adjusting portion, the first connecting portion being connected with one side of the displayer, the first adjusting portion being inserted into the accommodating space from the first opening, and the first adjusting portion passing through the second opening to project out of the accommodating space, the first adjusting portion having a plurality of first penetrating grooves penetrating through an outer surface and an inner surface of the first adjusting portion; and
a second headband disposed to the other side of the main body, the first headband and the second headband being disposed oppositely, two opposite ends of the second headband having a second connecting portion and a second adjusting portion, the second connecting portion being connected with the other side of the displayer, the second adjusting portion being inserted into the accommodating space from the second opening, and the second adjusting portion passing through the first opening to project out of the accommodating space, the second adjusting portion having a plurality of second penetrating grooves penetrating through an outer surface and an inner surface of the second adjusting portion;
wherein the first elastic block is buckled with or breaks away from one of the plurality of the first penetrating grooves, the second elastic block is buckled with or breaks away from another one of the plurality of the second penetrating grooves.

12. The headband adjusting assembly as claimed in claim 11, wherein a rear surface of a free end of the first elastic arm protrudes rearward to form the first elastic block, a front surface of the free end of the first elastic arm protrudes frontward to form a first operation portion, the first operation portion and the first elastic block are disposed oppositely, a rear surface of a free end of the second elastic arm protrudes rearward to form the second elastic block, a front surface of the free end of the second elastic arm protrudes frontward to form a second operation portion, the second operation portion and the second elastic block are disposed oppositely.

13. The headband adjusting assembly as claimed in claim 12, wherein an outer surface of the first operation portion is recessed inward to form a first concave groove, an outer surface of the second operation portion is recessed inward to form a second concave groove, the first concave groove and the second concave groove are disposed oppositely.

14. The headband adjusting assembly as claimed in claim 11, wherein the main body has a shell and a cover, the cover is covered to a rear of the shell to form the accommodating space between the shell and the cover, a front surface of the cover is recessed rearward to form a receiving groove, the isolating plate is spaced from the front surface of the cover, the receiving groove is formed between the isolating plate and the front surface of the cover, two opposite sides of the receiving groove are communicated with the first opening and the second opening, the first adjusting portion is aligned with the second adjusting portion along an up-down direction, the first adjusting portion and the second adjusting portion are movably received in the receiving groove.

15. A headband adjusting assembly, comprising:
a main body, two sides of the main body defining a first opening penetrating through an outer surface of one side of the main body, and a second opening penetrating through an outer surface of the other side of the main body, the second opening being opposite to the first opening, an inside of the main body having an accommodating space, the accommodating space being communicated with the first opening and the second opening;

an isolating plate accommodated in the accommodating space, the isolating plate having a base plate, a middle of one side of the base plate extending outward to form a first elastic arm, a middle of the other side of the base plate extending outward to form a second elastic arm, a rear surface of the first elastic arm extending rearward to form a first elastic block, a front surface of the first elastic arm protruding frontward to form a first operation portion, an outer surface of the first operation portion being recessed inward to form a first concave groove, a rear surface of the second elastic arm extending rearward to form a second elastic block, a front surface of the second elastic arm protruding frontward to form a second operation portion, an outer surface of the second operation portion being recessed inward to form a second concave groove, the first elastic arm, the first operation portion and the first elastic block being disposed outside of the first opening, the second elastic arm, the second operation portion and the second elastic block being disposed outside of the second opening;

a first headband disposed to one side of the main body, the first headband having a first adjusting portion, the first adjusting portion being inserted into the accommodating space from the first opening, and the first adjusting portion passing through the second opening to project out of the accommodating space, the first adjusting portion having a plurality of first penetrating grooves penetrating through an outer surface and an inner surface of the first adjusting portion; and a second headband disposed to the other side of the main body, the second headband having a second adjusting portion, the second adjusting portion being inserted into the accommodating space from the second opening, and the second adjusting portion passing through the first opening to project out of the accommodating space, the second adjusting portion having a plurality of second penetrating grooves penetrating through an outer surface and an inner surface of the second adjusting portion;

wherein the first elastic block is buckled with or breaks away from any one of the plurality of the first penetrating grooves, the second elastic block is buckled with or breaks away from any one of the plurality of the second penetrating grooves.

* * * * *